(12) United States Patent
Dwyer et al.

(10) Patent No.: US 7,997,136 B2
(45) Date of Patent: *Aug. 16, 2011

(54) MEMS FORCE BALANCE ACCELEROMETER

(75) Inventors: Paul W. Dwyer, Seattle, WA (US); Ryan Roehnelt, Kenmore, WA (US)

(73) Assignee: Honeywell International Inc., Morristown, NJ (US)

( * ) Notice: Subject to any disclaimer, the term of this patent is extended or adjusted under 35 U.S.C. 154(b) by 308 days.

This patent is subject to a terminal disclaimer.

(21) Appl. No.: 12/247,512

(22) Filed: Oct. 8, 2008

(65) Prior Publication Data

US 2010/0083759 A1   Apr. 8, 2010

(51) Int. Cl.
G01P 15/08   (2006.01)

(52) U.S. Cl. .................................... 73/514.31

(58) Field of Classification Search ............... 73/514.31, 73/514.32, 514.16, 514.21, 514.22, 514.23, 73/514, 32, 514.36, 514.37, 514.12, 514.13
See application file for complete search history.

(56) References Cited

U.S. PATENT DOCUMENTS

| | | | | |
|---|---|---|---|---|
| 4,088,027 A | 5/1978 | Hernandez et al. | ......... | 73/514.21 |
| 4,510,802 A | 4/1985 | Peters | ........................ | 73/504.12 |
| 4,726,228 A | 2/1988 | Norling | ....................... | 73/514.21 |
| 4,854,169 A | 8/1989 | Sakuma et al. | ................. | 73/497 |
| 4,944,184 A | 7/1990 | Blake et al. | ................. | 73/514.23 |
| 5,524,488 A * | 6/1996 | Foote | ......................... | 73/514.23 |
| 5,693,883 A | 12/1997 | Giroud et al. | ............... | 73/514.24 |
| 5,731,703 A | 3/1998 | Bernstein et al. | ............. | 324/256 |
| 5,739,431 A | 4/1998 | Petri | ............................... | 73/509 |
| 6,422,076 B1 | 7/2002 | Prokofiev et al. | .......... | 73/514.23 |
| 6,664,786 B2 | 12/2003 | Kretschmann et al. | ....... | 324/259 |
| 6,776,042 B2 | 8/2004 | Pike et al. | ................... | 73/514.32 |
| 7,191,654 B2 * | 3/2007 | Dwyer et al. | ............... | 73/514.23 |
| 7,303,935 B2 | 12/2007 | DeNatale et al. | ............... | 438/48 |
| 7,346,981 B2 | 3/2008 | Borwick, III et al. | .......... | 29/846 |
| 7,347,097 B2 * | 3/2008 | Chernyak et al. | .......... | 73/514.17 |
| 2003/0140699 A1 | 7/2003 | Pike et al. | .................. | 73/514.32 |
| 2010/0083760 A1 * | 4/2010 | Dwyer | ....................... | 73/514.31 |

FOREIGN PATENT DOCUMENTS

FR   2637984 A   4/1990

* cited by examiner

*Primary Examiner* — Hezron Williams
*Assistant Examiner* — Tamiko D Bellamy
(74) *Attorney, Agent, or Firm* — Black Lowe & Graham PLLC

(57) ABSTRACT

Microelectromechanical (MEMS) accelerometer and acceleration sensing methods. A MEMS accelerometer includes a proof mass, a planar coil on the proof mass, a magnet, a first pole piece positioned proximate a first side of the proof mass, and a second pole piece positioned proximate a second side of the proof mass. A magnetic flux field passes from the magnet, through the first pole piece, through the planar coil at an angle between approximately 30 degrees and approximately 60 degrees relative to the coil plane, and into the second pole piece. The first pole piece may extend into a first recessed area of a first housing layer and the second pole piece may extend into a second recessed area of a second housing layer. A method includes sensing a capacitance of a pickoff in the MEMS accelerometer and rebalancing the MEMS accelerometer by sending a current through the planar coil.

12 Claims, 4 Drawing Sheets

MEMS FORCE BALANCE ACCELEROMETER

BACKGROUND OF THE INVENTION

Typical configurations for force balance microelectromechanical (MEMS) accelerometers that have a proof mass with a coil have a magnetic circuit configuration with a large reluctance value. Generally, previous coil and magnetic circuit configurations are structured such that a magnetic field runs parallel with the plane of a spiral coil. The magnetic field excites a return path that penetrates a proof mass using holes. A gap in the magnetic return path with this configuration is defined by a diameter of the coil, and is thus relatively large with a corresponding large reluctance of the magnetic circuit which results in a high scale factor. This type of coil configuration requires a level of current to servo the accelerometer that generates heating effects that create nonlinearities which degrade performance.

SUMMARY OF THE INVENTION

The present invention is a system a microelectromechanical (MEMS) accelerometer and acceleration sensing methods having improved sensitivity, a greater signal to noise ratio, and lower power requirements. An example MEMS accelerometer includes a proof mass suspended by at least one flexure, a planar coil on the proof mass, at least one magnet, a first pole piece positioned proximate a first side of the proof mass, and a second pole piece positioned proximate a second side of the proof mass. A magnetic flux field passes from at least one of the at least one magnets, through the first pole piece, through the planar coil at a flux angle between approximately 30 degrees and approximately 60 degrees relative to the coil plane, and into the second pole piece. In an example embodiment, the flux angle is approximately 45 degrees. A method includes sensing a capacitance of a pickoff in the MEMS accelerometer and rebalancing the MEMS accelerometer by sending a current through the planar coil.

In accordance with further aspects of the invention, the at least one magnet includes a first magnet adjacent to the first pole piece and a second magnet adjacent to the second pole piece.

In accordance with other aspects of the invention, the first magnet has an annular shape.

In accordance with still further aspects of the invention, the MEMS accelerometer further includes a first housing layer positioned on a first side of the proof mass and a second housing layer positioned on a second side of the proof mass. The first housing layer defines a first recessed area and the second housing layer defines a second recessed area. The first pole piece extends at least partially into the first recessed area and the second pole piece extends at least partially into the second recessed area. The first and second recessed areas allow the first and second pole pieces to have a smaller gap between them, which results in a lower reluctance for a magnetic circuit that passes through the coil on the proof mass.

In accordance with yet other aspects of the invention, a method includes sensing a capacitance of a pickoff in the MEMS accelerometer and rebalancing the MEMS accelerometer by sending a current based on the sensed capacitance through the planar coil.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
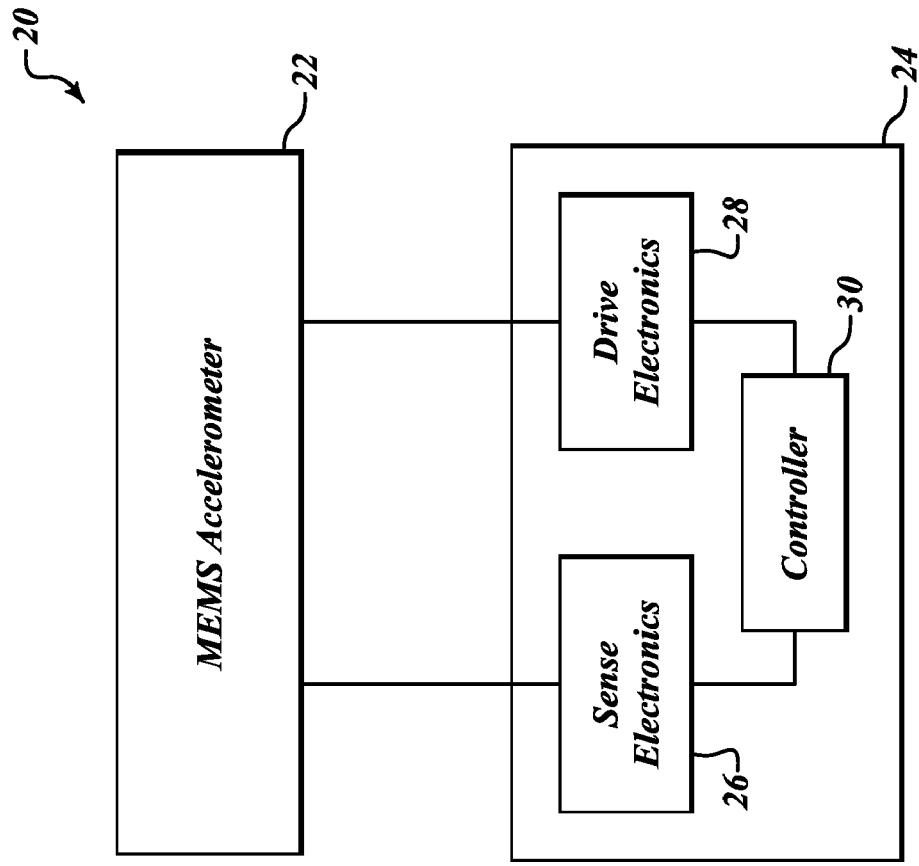
FIG. 1 is a block diagram of a microelectromechanical (MEMS) accelerometer system formed in accordance with an embodiment of the invention.

FIG. 1 is a block diagram of a microelectromechanical (MEMS) accelerometer system 20 formed in accordance with an embodiment of the invention. The MEMS accelerometer system 20 includes an accelerometer 22 and a control unit 24. The control unit 24 includes a sense electronics component 26 and a drive electronics component 28, both in signal communication with the MEMS accelerometer 22. The control unit 24 also includes a controller 30 in signal communication with the sense electronics component 26 and the drive electronics component 28. Generally, the accelerometer 22 includes a proof mass suspended by at least one flexure within a housing and a magnetic rebalancing component for rebalancing the proof mass about the at least one flexure. The magnetic rebalancing component includes at least one magnet, at least one pole piece, and a magnetic return path structure. The magnetic rebalancing component servo actuates the accelerometer 22 by passing a current through at least one planar coil located on the proof mass that lies within a magnetic flux field that passes at an angle between approximately 30 degrees and approximately 60 degrees relative to the coil plane through the at least one planar coil. The magnetic flux field includes a component in the plane of the coil and a component normal to the plane of the coil. The component of the magnetic flux field in the plane of the coil is used to servo actuate the proof mass. A magnetic shield may be present around the accelerometer 22 and/or the accelerometer system 20 in some embodiments for use in a multi-sensor environment. Additional detail for example embodiments of the accelerometer 22 is discussed with respect to FIG. 2.

Figure 2:
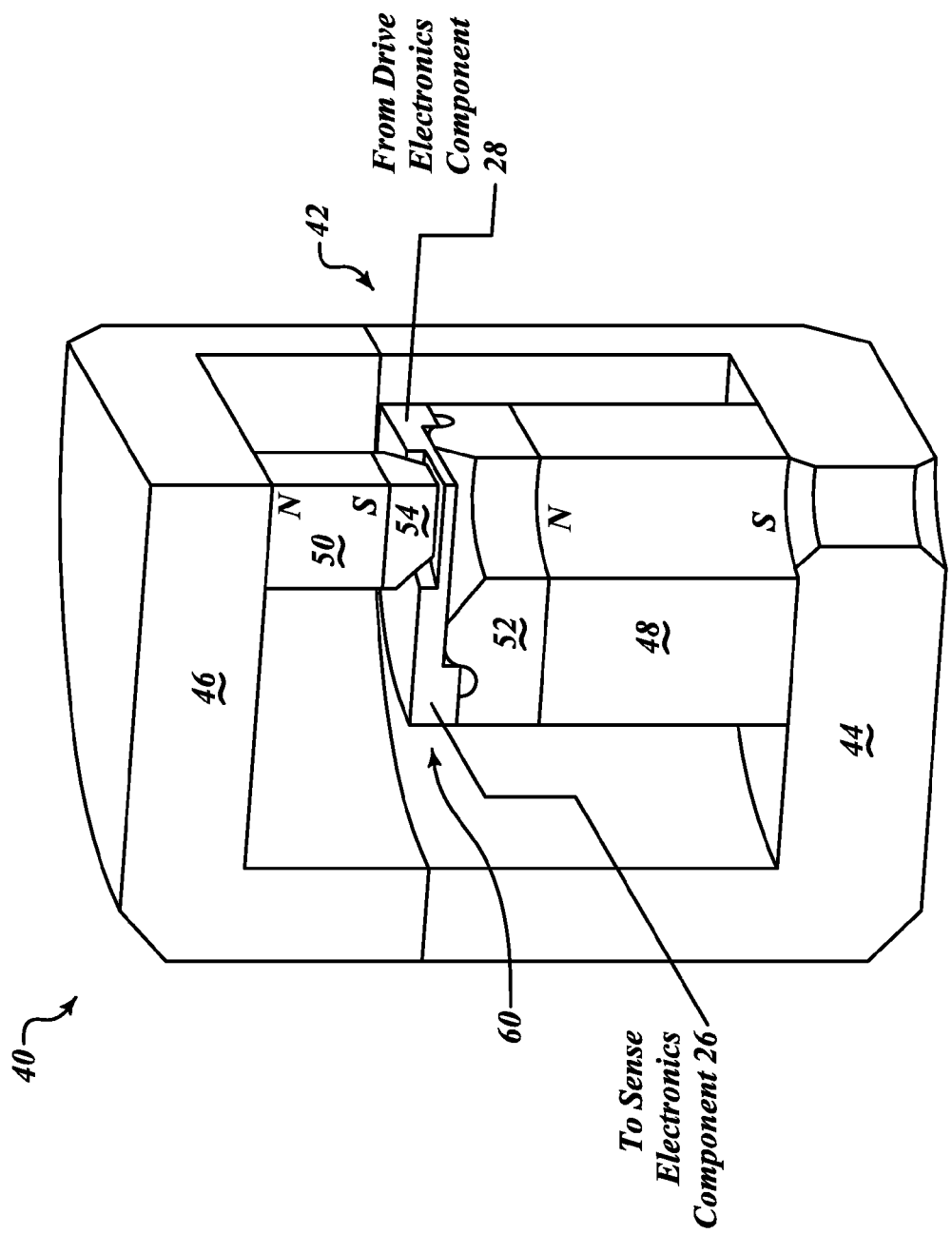
FIG. 2 is a diagram of a perspective view of a quarter section of a MEMS accelerometer formed in accordance with an example embodiment of the invention.

FIG. 2 is a diagram of a perspective view of a quarter section of a MEMS accelerometer 40 formed in accordance with an example embodiment of the invention. The accelerometer 40 is an example of the accelerometer 22 shown in FIG. 1. The accelerometer 40 includes a magnetic return path housing structure 42. The magnetic return path housing structure 42 includes a first piece 44 and a second piece 46. The magnetic return path housing structure 42 may be formed of a magnetic alloy with a thermal expansion coefficient similar to silicon. The magnetic return path housing structure 42 may be formed of invar 39, for example. A first end of a first magnet 48 is attached to an inner surface of the first piece 44 of the magnetic return path housing structure 42 and a first end of a second magnet 50 is attached to an inner surface of the second piece 46 of the magnetic return path housing structure 42. A first pole piece 52 is attached to a second end of the first magnet 48 and a second pole piece 54 is attached to a second end of the second magnet 50. In an example embodiment, the first and second pole pieces 52, 54 are formed of a magnetically permeable material such as 430F or 430FR stainless steel. The first and second pole pieces 52, 54 may also be formed of a material such as alloy 39 that has a coefficient of thermal expansion (CTE) relatively close to the CTE of silicon to provide additional stability over a range of temperature variation. A device stack 60 is positioned between the first pole piece 52 and the second pole piece 54.

Figure 3:
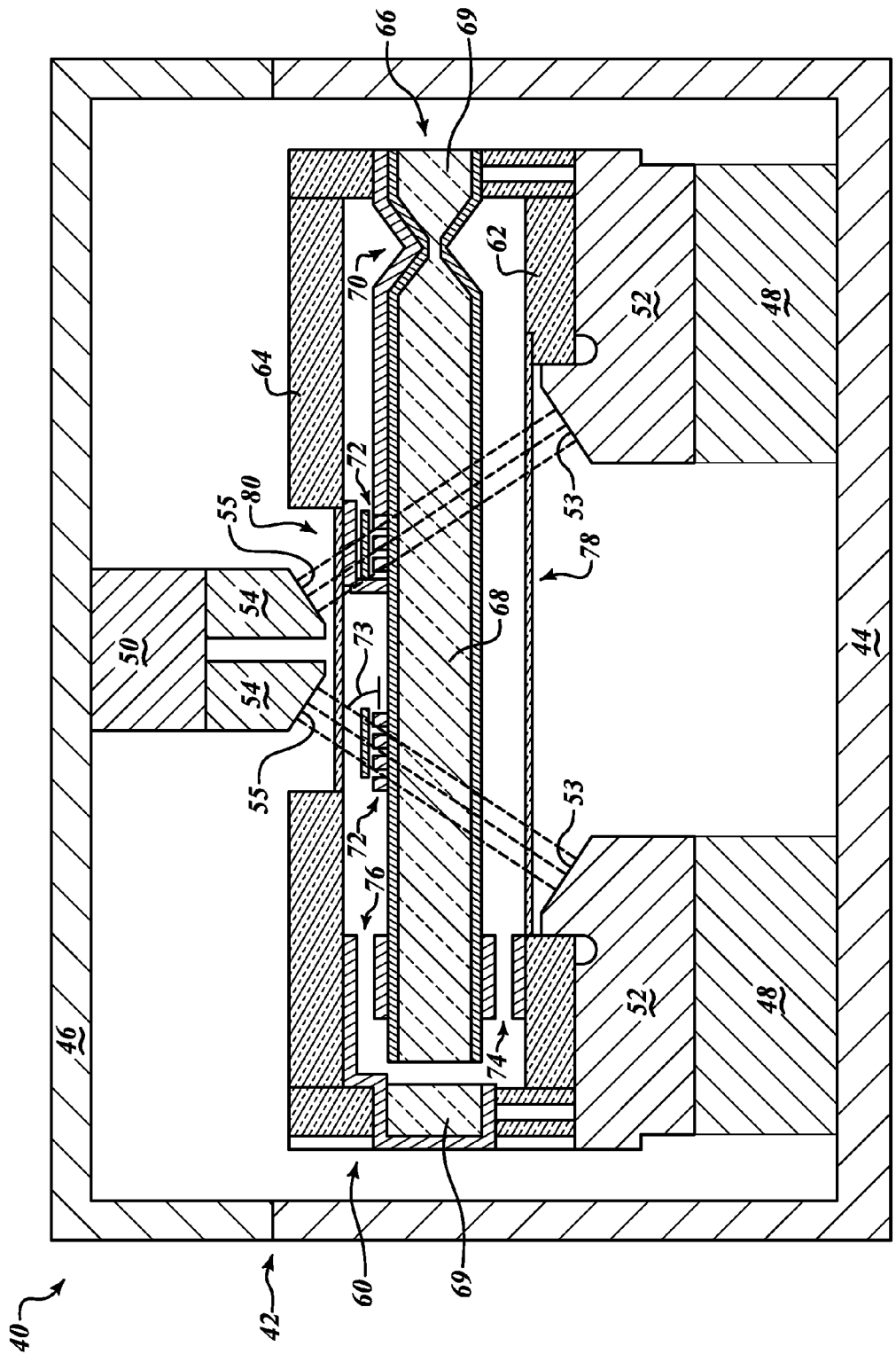
FIG. 3 is a diagram of a cross-sectional side view of the MEMS accelerometer shown in FIG. 2.

FIG. 3 is a diagram of a cross-sectional side view of the MEMS accelerometer 40 showing additional detail for the device stack 60 shown in FIG. 2. FIG. 3 is not shown with the same relative scale for various components as FIG. 2 for clarity. The device stack 60 includes a first housing layer 62 and a second housing layer 64 that may be formed of an insulating material such as borosilicate glass in an example embodiment. A device layer 66 is positioned between the first and second housing layers 62, 64. The device layer 66 includes a proof mass 68 that is suspended in an outer ring 69 within the first and second housing layers 62, 64 by at least one flexure 70. In an example embodiment, the flexure 70 is a hinge type flexure and the proof mass is formed of silicon. A spiral planar coil 72 is located on a first side of the proof mass 68. The coil 72 is formed of metalized traces in an example embodiment, but may also be formed in a different manner. In an example embodiment, each of the coils 72 has approximately 10 turns that is approximately 45 microns wide with a spacing between turns of approximately 15 microns and a thickness of approximately 0.5 microns. However, other coil configurations such as oval or rectangular spirals may be used and different numbers of turns and dimensions may be used in some embodiments. Additionally, a second coil on the second side of the proof mass may also be present.

The first and second pole pieces 52, 54 are positioned such that a magnetic flux angle 73 of approximately 45 degrees is present relative to the plane of the coil 72. Although a cross-section of the magnetic flux field may have some curvature, the flux field is preferably approximately linear through the plane of the coils 72. A first pickoff 74 is positioned on the first side of the proof mass 68 and a second pickoff 76 is positioned on a second side of the proof mass 68. The first housing layer 62 defines a first recessed area 78 and the second housing layer defines a second recessed area 80. The first pole piece 52 includes a face 53 proximate the first side of the proof mass 68 that is positioned partially within the first recessed area 78 and the second pole piece 54 includes a face 55 positioned proximate the second side of the proof mass 68 that is positioned partially within the second recessed area 80.

In an example embodiment, the first and second magnets 48, 50 are charged in an orientation normal to the plane of the proof mass 68. This charging orientation results in a north pole of the first magnet 48 being in contact with the first pole piece 52 and a south pole of the first magnet 48 being in contact with the magnetic return path housing structure 42. This also results in a north pole of the second magnet 50 being in contact with the magnetic return path housing structure 42 and a south pole of the second magnet 50 being in contact with the second pole piece 54. Other charging orientations may be used in other embodiments. The first magnet 48 is shown as an annular magnet. However, other shapes may be used, or a plurality of magnets rather than a single magnet in contact with the first pole piece 52. The second magnet 50 is shown as a solid closed cylinder in FIGS. 2 and 3. However, other shapes, such as an annular shape may be used.

Figure 4:
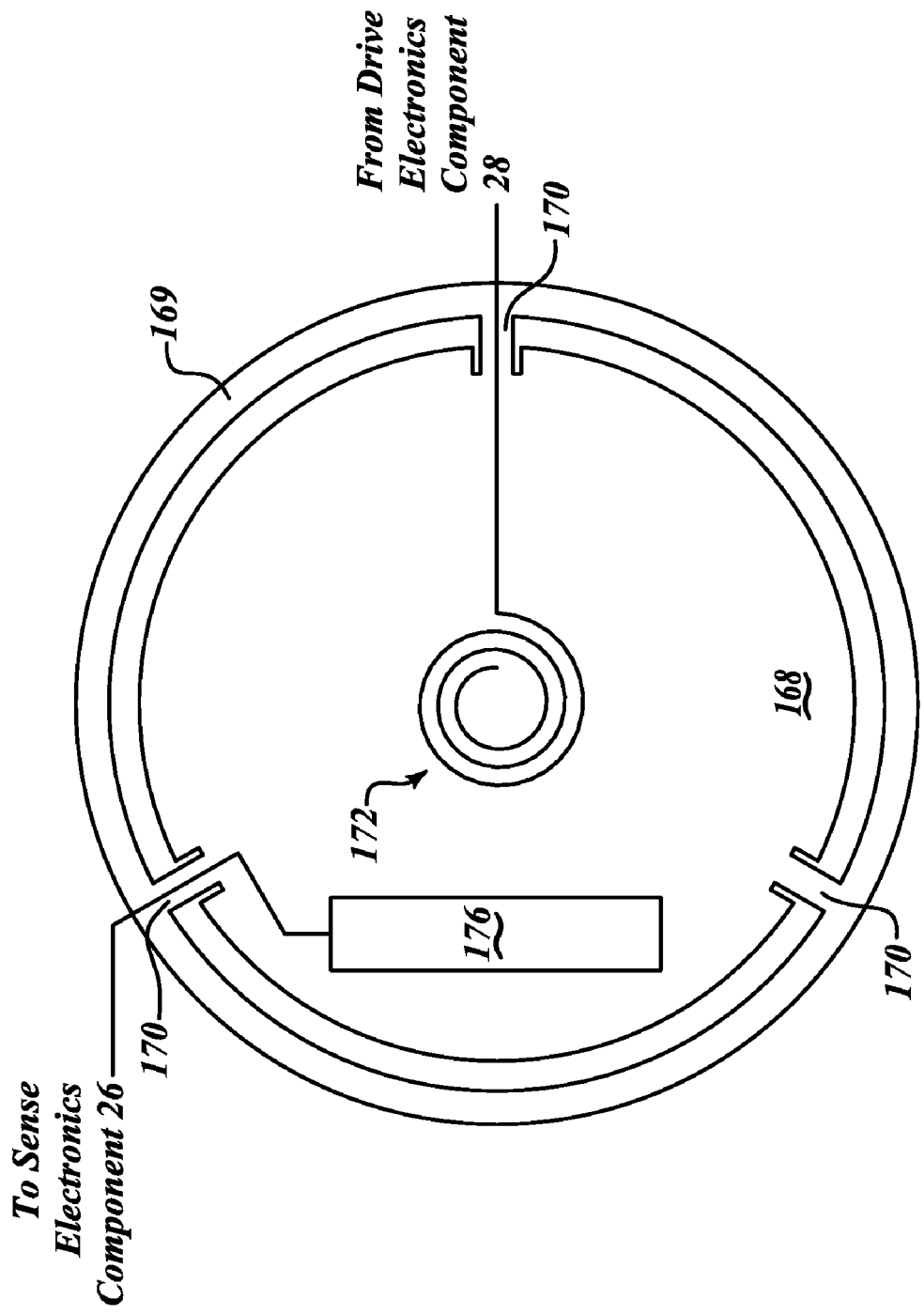
FIG. 4 is a diagram of a top view of a proof mass formed in accordance with an embodiment of the invention.

FIG. 4 is a top view of a proof mass 168 formed in accordance with an embodiment of the invention. The proof mass 168 is suspended in an outer ring 169 by a plurality of flexures 170. A spiral planar coil 172 is located on the proof mass 168. A plate 176 of a pickoff is also located on the proof mass 168. In an example embodiment, the proof mass 168 corresponds to the proof mass 68, one of the flexures 170 corresponds to the flexure 70, the coil 172 corresponds to the coil 72, and the plate 176 corresponds to a portion of the pickoff 76 shown in FIG. 3. The coil 172 may be in signal communication with the drive electronics component 28 and the plate 176 may be in signal communication with the sense electronics component 26 shown in FIG. 1 in an example embodiment. An inner portion of the coil 172 may also include a connection (not shown) to the drive electronics component 28.

While the preferred embodiment of the invention has been illustrated and described, as noted above, many changes can be made without departing from the spirit and scope of the invention. For example, the second magnet 50 may not be present in some embodiments, with the second pole piece 54 being directly connected to the magnetic path return structure 42. Additional magnets or different magnet and pole piece configurations may also be used in some embodiments. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A microelectromechanical (MEMS) accelerometer comprising:
   a housing;
   a proof mass suspended within the housing by at least one flexure;
   at least one planar coil located on the proof mass;
   at least one magnet;
   a first pole piece adjacent to at least one of the at least one magnets; and
   a second pole piece,
   wherein at least one face of the first pole piece is positioned proximate a first side of the proof mass and at least one face of the second pole piece is positioned proximate a second side of the proof mass such that a magnetic flux field passes from the magnet, through the face of the first pole piece, through the at least one planar coil at a flux angle between approximately 30 degrees and approximately 60 degrees relative to a coil plane, and into the second pole piece.

2. The MEMS accelerometer of claim 1, wherein the at least one magnet comprises:
   a first magnet adjacent to the first pole piece; and
   a second magnet adjacent to the second pole piece.

3. The MEMS accelerometer of claim 2, further comprising a magnetic return path structure coupled to the first magnet and the second magnet.

4. The MEMS accelerometer of claim 2, wherein the first magnet has an annular shape.

5. The MEMS accelerometer of claim 1, wherein the flux angle is approximately 45 degrees.

6. The MEMS accelerometer of claim 1, wherein the housing comprises a first housing layer positioned on the first side of the proof mass, the first housing layer defining a first recessed area, wherein at least one of the at least one faces of the first pole piece positioned proximate the first side of the proof mass extends at least partially into the first recessed area.

7. The MEMS accelerometer of claim 6, wherein the housing further comprises a second housing layer positioned on the second side of the proof mass, the second housing layer defining a second recessed area, wherein at least one of the at least one faces of the second pole piece positioned proximate the second side of the proof mass extends at least partially into the second recessed area.

8. The MEMS accelerometer of claim 7, wherein the first and second housing layers are comprised of borosilicate glass.

9. The MEMS accelerometer of claim 1, wherein the flux angle is between approximately 40 degrees and approximately 50 degrees.

10. A method of operating a MEMS accelerometer, the method comprising:
   sensing a capacitance of a pickoff in the MEMS accelerometer;
   applying an annular magnetic field across a proof mass suspended by flexures within a housing, the magnetic field having an angle between 30 and 60 degrees with respect to the surface of the proof mass; and
   generating a force on the proof mass by applying a current through a planar coil located on a side of the proof mass, the current based on the sensed capacitance and the magnetic field value.

11. The method of claim 10, wherein sensing a capacitance of a pickoff in the MEMS accelerometer includes sensing a differential change in capacitance of a first pickoff and a second pickoff.

12. A microelectromechanical (MEMS) accelerometer comprising:
   a silicon device layer comprising a MEMS proof mass suspended by at least one flexure;
   a first glass housing layer located on a first side of the device layer, the first glass housing layer defining a first recessed area;
   a second glass housing layer located on a second side of the device layer, the second glass housing layer defining a second recessed area;
   a planar coil located on the proof mass;
   a first annular magnet positioned on the first side of the proof mass;
   a first pole piece adjacent the first magnet, the first pole piece extending into the first recessed area, the first pole piece having a face proximate the proof mass;
   a second magnet positioned on a second side of the proof mass;
   a second pole piece adjacent the second magnet, the second pole piece extending into the second recessed area, the second pole piece having a face proximate the proof mass; and
   a magnetic return path structure coupled to the first magnet and the second magnet,
   wherein the face of the first pole piece and the face of the second pole piece are positioned such that a magnetic flux field passes through the planar coil at a flux angle of approximately 45 degrees relative to a coil plane.

* * * * *